Nov. 16, 1965　　　G. F. CARLSON　　　3,218,093
DEVICE FOR CONNECTING TUBES OR PIPES
Filed July 18, 1962
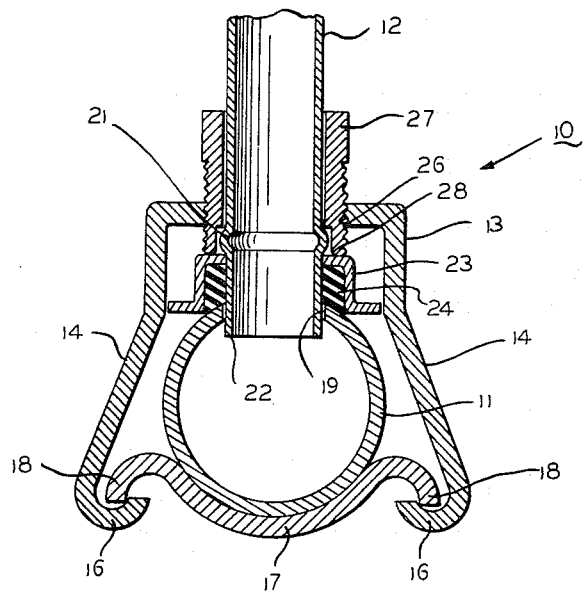
FIG. 1
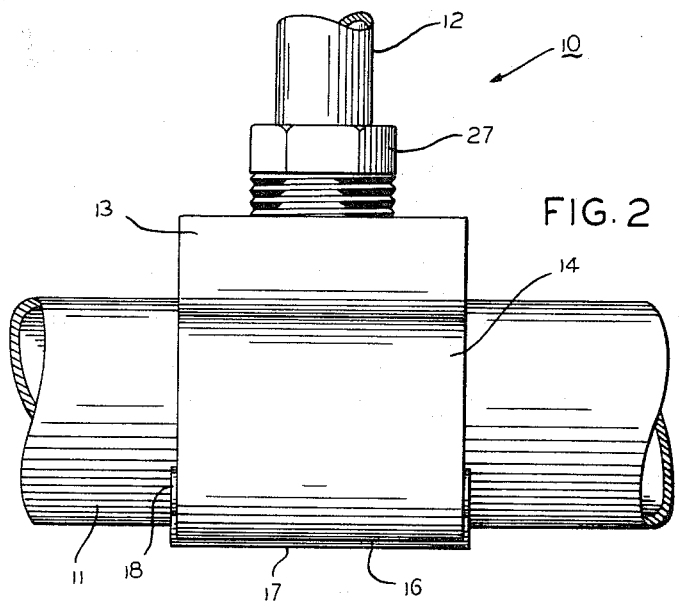
FIG. 2
INVENTOR.
GILBERT F. CARLSON
BY
ATTORNEY United States Patent Office 3,218,093
Patented Nov. 16, 1965

3,218,093
DEVICE FOR CONNECTING TUBES OR PIPES
Gilbert F. Carlson, Skokie, Ill., assignor, by mesne assignments, to International Telephone and Telegraph Corporation, New York, N.Y., a corporation of Maryland
Filed July 18, 1962, Ser. No. 210,711
1 Claim. (Cl. 285—197)

This invention relates generally to tube or pipe connections, and more particularly to a device for connecting a branching tube to a main tube without the need of flaring the end of the branching tube.

It is a principal object of this invention to provide a tube connecting device, which device is characterized by it being unnecessary to flare the end of the tube branching from the main tube.

Another object is to provide a device for connecting tubing such as copper tubing or the like, such as may be found in commercial and residential water supply and heating and air conditioning systems.

Another object is to provide a tube connecting device wherein a single threaded member serves the function of securing the device to the main tube and providing a fluid tight connection between the main tube and the branching tube.

Still another object is to provide a connecting device wherein it is unnecessary to flare the end of the branching tube, and wherein a single threaded member performs the function of securing the device to one of the tubes and of effecting a seal between the two tubes.

Other objects and important features of the invention will be apparent from a study of the following specification, taken with the drawing, which together describe and illustrate a preferred embodiment of the invention, and what is now considered to be the best mode of practicing the principles thereof. Other embodiments may be suggested to those having the benefit of the teachings herein, and such other embodiments are intended to be reserved especially as they fall within the scope and spirit of the subjoined claims.

In the drawing:

FIG. 1 is a transverse section through a device for connecting tubes or pipes, said device embodying the improvements according to the present invention; and FIG. 2 is an elevational view thereof.

Referring now to the drawing, the device according to the present invention is referred to by the reference numeral 10 and is adapted to provide a connection between a main tube or pipe 11 and a branching tube or pipe 12. The device 10 includes a yoke member 13 having a pair of legs 14 which straddle the main tube or pipe 11 and which are spaced therefrom. Each of the straddling legs 14 terminates along the lower extremities thereof in a hook 16 adapted to be in separable locking engagement with a locking member 17, each end of the locking member 17 having hook-like extremities 18 in hooking engagement with the hook 16 at the ends of the straddling legs 14. The contour of the locking member 17 conforms substantially to the outer diameter of the main tube 11.

The main tube 11 is drilled with a hole 19 to receive the branching tube or pipe 12. This previously is deformed by a crimping plier or the like to provide a land 21 which is spaced from the end 22 of the tube 12. In lieu of a continuous land 21 the crimping tool may be provided with suitable die-like members to provide a plurality of small protuberances having a cross section corresponding to that obtaining in the land 21.

Structure is provided for effecting a seal between the branching tube 12 and the main tube 11, and such structure consists of a cup-shaped member 23 supporting a gasket material 24, both the cup-shaped member 23 and the gasket material 24 having a suitable aperture therein whereby the two can be slid over the end of the branching tube 12 and positioned against the land 21 prior to the insertion of the branching tube 12 into the main tube 11 at the drilled opening 19.

A single structure is provided for imposing a holding strain on the yoke member 13 and the locking member 17, and for imposing a sealing strain on the gasket material 24. To this end the yoke member is drilled and tapped as at 26 to receive a cylindrical nut 27. It may be noted that the nut 27 is placed upon the branching tube 12 prior to the formation of the land 21. It will be seen that the threaded engagement of the nut 27 with the yoke 13 and its engagement with the cup-shaped member 23 will securely hold the yoke member 13 and the locking member 17 in position on the main tube 11, at the same time providing a seal between the branching tube 12 and the main tube 11.

It may be noted that the inside diameter of the securing nut 27 is slightly larger than the outside diameter of the branching tube 12, so as to have a loose sliding fit thereon, and that there is provided a flared surface 28 at the end of the nut 27 adapted to contact the land 21 of the branching tube 12. This prevents the tube 12 from being separated from the device 10, the cooperation of the land 21 and the flared surface 28 preventing such separation.

However, the pressure from the securing nut 27 is not directed against the land 21, but rather against the member 23. The nut 21 does not, therefore, impose a crushing force against the land 21. The seal around the end 22 of tube 12 is achieved solely by the member 23 and gasket material 24. By reason of the clearance afforded between securing nut 27 and land 21 a limited amount of endwise movement of tube 12 with respect to pipe 11 is permitted without damage to land 21.

From the description, it is evident that there has been provided a device for connecting a main tube or pipe to a branching tube or pipe, all without the need of flaring the end of the branching pipe. The only operation necessary on the branching pipe is that of providing the land which limits the amount of penetration of the branching pipe into the main tube, and which prevents the unintended separation of the branching pipe from the connecting device.

While the invention has been described in terms of a preferred embodiment thereof, it is not intended that the invention be limited by the precise embodiment herein shown nor otherwise than by the terms of the appended claim.

I claim:

A device of the class described for connecting a branch tube to a main tube, said device comprising a yoke member having legs straddling said main tube, a locking member in separable locking engagement with said straddling legs, a threaded aperture in said yoke member, a branch tube adapted to be inserted into said main tube at a hole in said main tube substantially in alignment with said aperture, a land spaced from the end of said branching tube for limiting the amount of movement of said branching tube with respect to said main tube, sealing means comprising a gasket and retainer therefor adapted to be supported on said branch tube between said main tube and said land, and single threaded means having a counter bore in the inner end thereof terminating in a shoulder of reduced diameter supported on said branch tube and in threaded engagement with said yoke member and solely in contact with said retainer for imposing a holding strain on said yoke member and said locking member and a sealing strain on said sealing means, said last named means having an internal diameter near the end thereof larger than the diameter of said land whereby the movement of said branching tube with respect to said main tube is limited to the distance between said retainer and the point of smaller diameter of said threaded means.

References Cited by the Examiner
UNITED STATES PATENTS 1,545,493 7/1925 Hoffman _____ 285—198
2,703,719 3/1955 Crothers _____ 285—212

FOREIGN PATENTS 879,148 11/1942 France.
831,046 2/1952 Germany.

CARL W. TOMLIN, *Primary Examiner.*